(12) United States Patent
Morris

(10) Patent No.: US 8,261,675 B2
(45) Date of Patent: *Sep. 11, 2012

(54) PLASTIC PALLET SYSTEM

(75) Inventor: Gary W. Morris, Evansville, IN (US)

(73) Assignee: Paradigm Plastic Products, LLC, Evansville, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/046,384

(22) Filed: Mar. 11, 2011

(65) Prior Publication Data

US 2011/0162562 A1   Jul. 7, 2011

Related U.S. Application Data

(63) Continuation of application No. 12/251,972, filed on Oct. 15, 2008, now Pat. No. 7,926,431.

(60) Provisional application No. 60/980,328, filed on Oct. 16, 2007.

(51) Int. Cl.
   *B65D 19/38* (2006.01)

(52) U.S. Cl. ............... 108/57.22; 108/57.25; 108/57.31; 108/57.21

(58) Field of Classification Search ............... 108/57.25, 108/51.11, 56.1, 51.3, 57.2, 57.21, 27, 57.31, 108/57.22; 248/346.02; 206/386, 600, 599

See application file for complete search history.

(56) References Cited

U.S. PATENT DOCUMENTS

| | | | |
|---|---|---|---|
| 2,503,022 A | 4/1950 | Benoist et al. | |
| 2,922,606 A | 1/1960 | Glassman et al. | |
| 2,996,276 A * | 8/1961 | Sorensen et al. | 108/51.3 |
| 3,207,096 A * | 9/1965 | Munroe | 108/51.11 |
| 3,212,462 A * | 10/1965 | Pasquier | 108/51.11 |
| 3,664,271 A * | 5/1972 | Wolder et al. | 108/57.26 |
| 3,878,796 A | 4/1975 | Morrison | |
| 3,910,203 A | 10/1975 | Hamkins et al. | |
| 4,059,057 A | 11/1977 | Carnwath | |
| 4,077,334 A | 3/1978 | Svirklys | |
| 4,145,976 A | 3/1979 | Svirklys | |
| 4,230,051 A | 10/1980 | Mays | |
| 4,292,899 A | 10/1981 | Steffen | |
| 4,407,878 A * | 10/1983 | Smith et al. | 108/57.31 |
| 4,485,744 A | 12/1984 | Umemura et al. | |
| 4,503,780 A | 3/1985 | Apissomian | |
| 4,558,553 A | 12/1985 | Kolk | |
| 4,694,962 A | 9/1987 | Taub | |

(Continued)

FOREIGN PATENT DOCUMENTS

FR   2748257   11/1997

(Continued)

OTHER PUBLICATIONS

International Search Report for International Application No. PCT-US2008/080156, 14 pages.

*Primary Examiner* — Jose V Chen
(74) *Attorney, Agent, or Firm* — Faegre Baker Daniels LLP

(57) ABSTRACT

A plastic pallet system is provided for the support, storage, and transportation of articles. The plastic pallet system includes a plurality of top boards and a plurality of runner assemblies. Both the plurality of top boards and the plurality of runner assemblies may be formed of plastic. A method for manufacturing the plastic pallet system is also provided.

20 Claims, 7 Drawing Sheets

U.S. PATENT DOCUMENTS

| | | |
|---|---|---|
| 4,715,294 A | 12/1987 | Depew |
| 5,042,397 A | 8/1991 | Fiedler |
| 5,067,418 A | 11/1991 | Carter |
| 5,101,737 A | 4/1992 | Gomez |
| 5,320,048 A | 6/1994 | Feinder |
| 5,365,857 A | 11/1994 | Kilpatrick |
| 5,365,859 A | 11/1994 | Schrage |
| 5,367,960 A | 11/1994 | Schleicher |
| 5,388,533 A | 2/1995 | Pigott et al. |
| 5,417,167 A | 5/1995 | Sadr |
| 5,440,998 A | 8/1995 | Morgan et al. |
| 5,456,189 A | 10/1995 | Belle Isle |
| 5,458,069 A | 10/1995 | Stolzman |
| 5,551,353 A | 9/1996 | Fiedler |
| 5,573,322 A | 11/1996 | Wrobel |
| 5,879,495 A | 3/1999 | Evans |
| 5,896,818 A | 4/1999 | Phillips |
| 6,112,672 A | 9/2000 | Heil |
| 6,216,608 B1 | 4/2001 | Woods et al. |
| 6,524,426 B1 | 2/2003 | St. John et al. |
| 6,766,749 B2 | 7/2004 | Lacabanne |
| 6,837,170 B2 | 1/2005 | Taft |
| 6,839,952 B2 | 1/2005 | Hamilton |
| 6,938,558 B1 | 9/2005 | Peres |
| 7,219,609 B1 | 5/2007 | Utz et al. |
| 7,926,431 B2 * | 4/2011 | Morris ............ 108/57.25 |
| 2002/0056406 A1 | 5/2002 | Dumouchel |
| 2006/0230988 A1 | 10/2006 | Berg et al. |

FOREIGN PATENT DOCUMENTS

| | | |
|---|---|---|
| NL | 9102161 | 7/1993 |
| WO | WO-9113810 | 9/1991 |
| WO | WO-9728377 | 8/1997 |
| WO | WO-2004069671 | 8/2004 |

* cited by examiner

PLASTIC PALLET SYSTEM

CROSS REFERENCE TO RELATED APPLICATIONS

This application is a continuation of U.S. patent application Ser. No. 12/251,972, filed Oct. 15, 2008, now U.S. Pat. No. 7,926,431, which claims priority from U.S. Provisional Patent Application Ser. No. 60/980,328, filed Oct. 16, 2007, both entitled "Plastic Pallet System," the disclosures of which are expressly incorporated herein by reference.

BACKGROUND OF THE INVENTION

1. Field of the Invention

The present invention relates to a pallet system for the support, storage, and transportation of articles. More particularly, the present invention relates to a pallet system that is constructed of plastic, and to a method of manufacturing the same.

2. Description of the Related Art

The approaches described in this section could be pursued, but are not necessarily approaches that have been previously conceived or pursued. Therefore, unless otherwise indicated herein, the approaches described in this section are not teachings or suggestions of the prior art to the claims in this application and are not admitted to be prior art by inclusion in this section.

Pallets for the support, storage, and transportation of articles are in widespread usage. The most common pallet is constructed from wood and has a platform with multiple stringers beneath the platform. The stringers must be sufficiently sized and spaced to support the load on the platform while being lifted by a forklift, pallet jack, or another jacking device.

Pallets are subjected to rough usage. Therefore, their useful life is relatively short. Several factors combine to make wooden pallets especially frail. First, wooden pallets may mold, rot, mildew, and harbor germs and infestation. Second, wooden pallets become structurally unstable when they are exposed to the elements. Finally, wooden pallets have a tendency to splinter, especially when they are handled with little care and subjected to heavy loads.

The short useful life of a wooden pallet greatly impacts its cost. The USDA Forest Service determined that wooden pallets make only about 3 to 5 trips before requiring repair. The initial cost of a wooden pallet is relatively low—approximately $6. However, the cost-per-use of a wooden pallet averages $1.50. In contrast, plastic pallets may be more durable. Thus, although the initial cost of a plastic pallet may be more expensive than the initial cost of a wooden pallet, the cost-per-use of a plastic pallet may be lower than that of a wooden pallet. For example, if a plastic pallet costs $25, but can be used 18 times before requiring repair, the cost-per-use would only be $1.39.

In addition to lacking durability, wooden pallets are also heavy and bulky. In fact, some wooden pallets weigh twice as much as plastic pallets. A pallet's weight impacts much more than the force required to lift the pallet. For one, heavy pallets may lead to a higher incidence of worker injuries. Also, a pallet's weight directly affects the cost of shipping the pallet. A light-weight plastic pallet could significantly reduce both worker injuries and shipping costs.

Wooden pallets are also harmful to the environment. According to a 1998 Wall Street Journal article, about 40% of the hardwood lumber in the United States is used to make wooden pallets. Although 400 million pallets are produced each year, one third of the United States' landfills refuse to take pallets. On the other hand, a plastic pallet containing no metal parts is completely recyclable.

Finally, metal hardware may protrude from wooden pallets and damage goods or injure workers. Wooden pallets are typically constructed with metal hardware like screws or nails. These sharp objects may protrude from the pallet and damage the articles being supported, stored, or transported. Even worse, these sharp objects may injure workers handling the pallets. In contrast, a plastic pallet may be constructed without such hardware.

SUMMARY OF THE INVENTION

The present invention involves a plastic pallet system for the support, storage, and transportation of articles, and a method of manufacturing the same.

According to an embodiment of the present invention, a pallet system is provided that includes a plurality of top boards having an elongated planar configuration, the plurality of top boards formed of plastic, and a plurality of runner assemblies formed of plastic and positioned in spaced relation beneath the plurality of top boards, each of the plurality of runner assemblies extending between a first terminal end and a second terminal end along a runner axis, the runner axis oriented generally transversely to the plurality of top boards, each of the plurality of runner assemblies having a top runner board, a bottom runner board, a first runner support extending between the top and bottom runner boards, and a second runner support spaced apart from the first runner support and extending between the top and bottom runner boards, the first and second runner supports being spaced the same distance from the first terminal end of the runner assembly.

According to another embodiment of the present invention, a pallet system is provided that includes a plurality of top boards having an elongated planar configuration, the plurality of top boards formed of plastic, and a plurality of runner assemblies formed of plastic and positioned in spaced relation beneath the plurality of top boards, each of the plurality of runner assemblies extending between a first terminal end and a second terminal end along a runner axis, the runner axis oriented generally transversely to the plurality of top boards, each of the plurality of runner assemblies having a top runner board, a bottom runner board, a first runner support extending between the top and bottom runner boards and a second runner support spaced apart from the first runner support and extending between the top and bottom runner boards, the first and second runner supports being the first and second runner supports are arranged in parallel to each other and in a direction perpendicular to the runner axis.

According to yet another embodiment of the present invention, a pallet system is provided that includes a plurality of top boards having an elongated planar configuration, the plurality of top boards formed of plastic, each top board including a top wall, a bottom wall that extends substantially parallel to the top wall, and first and second side walls joining the top and bottom walls, the top wall, the bottom wall, and the first and second side walls of each top board cooperating to define a substantially hollow interior, the first side wall of at least an outer-most one of the plurality of top boards having an inner surface that faces the hollow interior and an outer surface opposite the inner surface, the inner surface extending from the top wall to the bottom wall in a direction perpendicular to the top and bottom walls, whereby the top and bottom walls are horizontally aligned at opposing ends of the first side wall, at least a portion of the outer surface deviating from the direction perpendicular to the top and bottom walls at a location between the top and bottom walls. The pallet system also includes a plurality of runner assemblies formed of plastic, the plurality of runner assemblies positioned beneath the plurality of top boards and extending generally transversely to the plurality of top boards, each of the plurality of runner assemblies having a top runner board, a bottom runner board, and a plurality of runner supports extending between the top and bottom runner boards.

It is an advantage of the present invention to provide a pallet that is both durable and lightweight. It is also an advantage of the present invention to provide a pallet that is cost effective, in terms of initial cost, cost-per-use, and shipping costs. Finally, it is an advantage of the present invention to provide a pallet that is safe for both the environment and workers handling the pallet.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Figure 1:
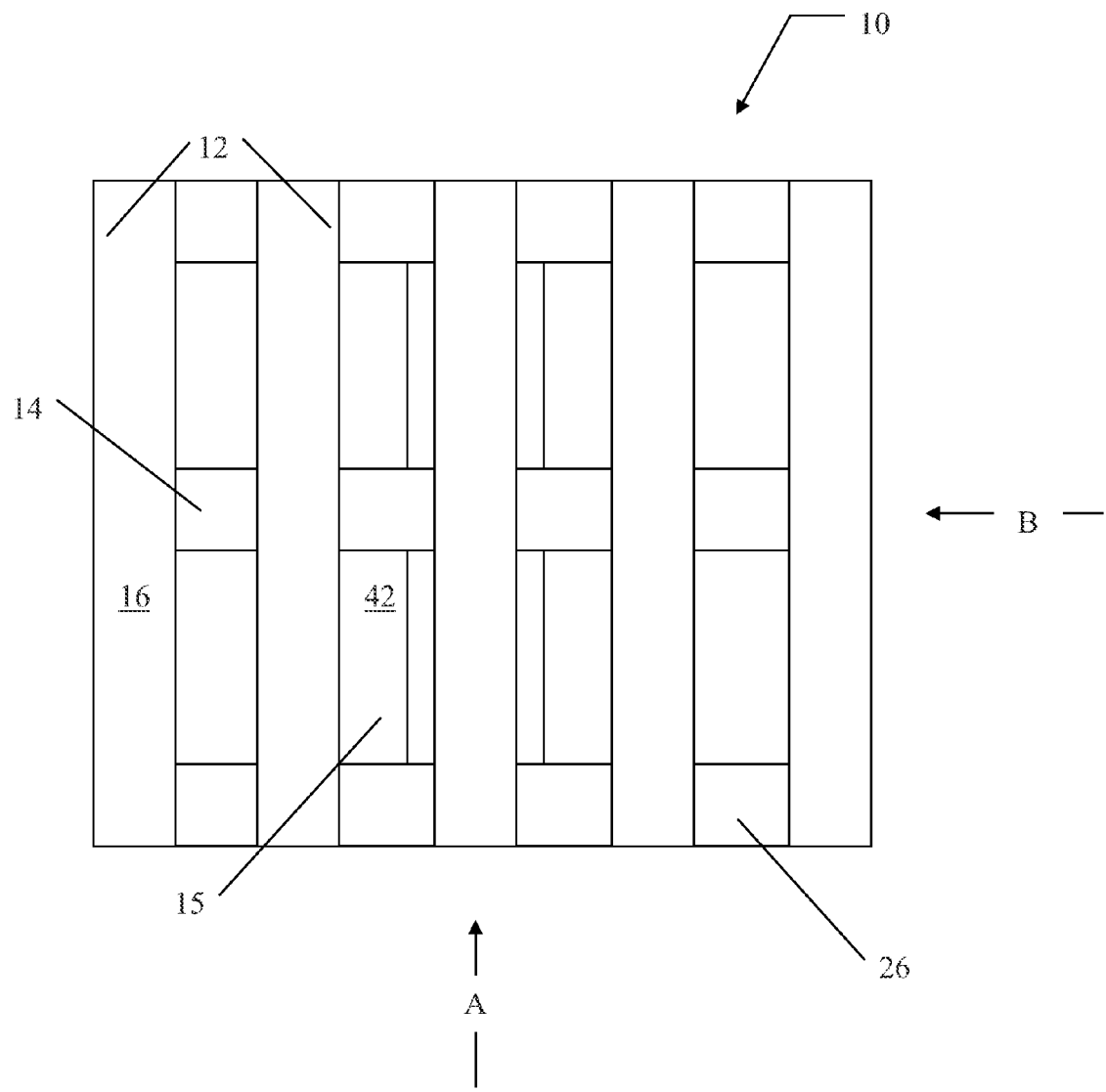
FIG. 1 is a plan view of a pallet in accordance with the present invention.

Corresponding reference characters indicate corresponding parts throughout the several views. Although the drawings represent embodiments of the present invention, the drawings are not necessarily to scale and certain features may be exaggerated in order to better illustrate and explain the present invention. The exemplification set out herein illustrates an embodiment of the invention, in one form, and such exemplifications are not to be construed as limiting the scope of the invention in any manner.

DESCRIPTION OF EMBODIMENTS OF THE PRESENT INVENTION

The embodiments disclosed below are not intended to be exhaustive or limit the invention to the precise forms disclosed in the following detailed description. Rather, the embodiments are chosen and described so that others skilled in the art may utilize their teachings.

Figure 1A:
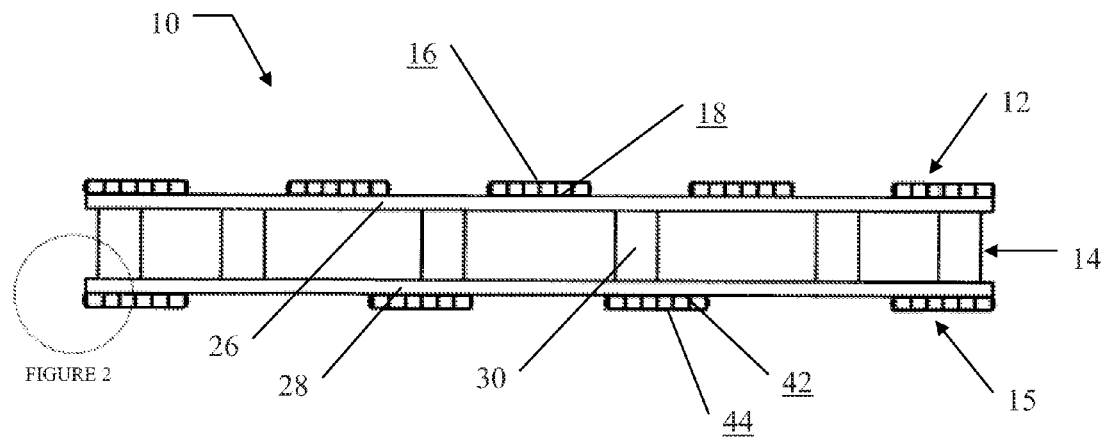
FIG. 1A is an elevational view of the pallet of FIG. 1, taken along arrow A of FIG. 1.
Figure 1B:
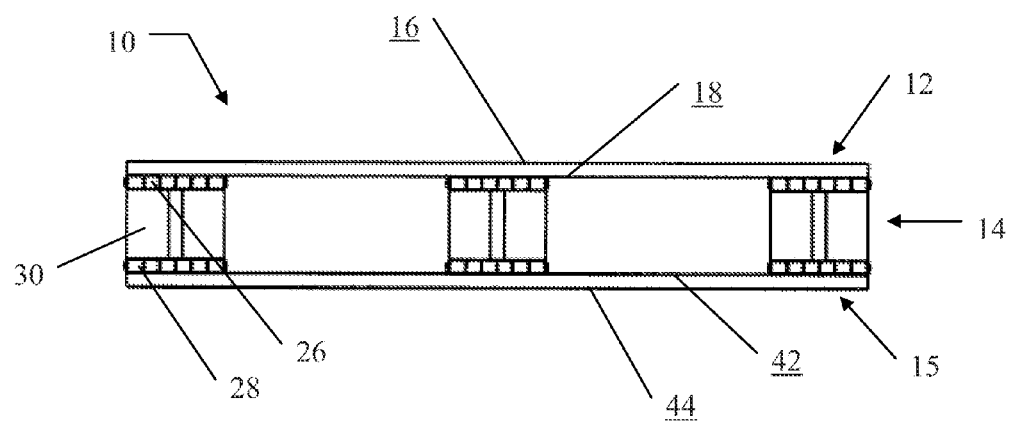
FIG. 1B is an elevational view of the pallet of FIG. 1, taken along arrow B of FIG. 1.

A pallet system for supporting, storing, and transporting articles and constructed according to the principles of this invention is indicated generally as pallet 10 in FIGS. 1, 1A, and 1B. Pallet 10 includes a plurality of top boards 12 and a plurality of runner assemblies 14 which extend generally transversely to top boards 12. Pallet 10 may also include a plurality of bottom boards 15 located beneath runner assemblies 14. Bottom boards 15 extend generally parallel to top boards 12 and generally transversely to runner assemblies 14.

According to an exemplary embodiment of the present invention, illustrated in FIG. 1A, pallet 10 includes more top boards 12 than bottom boards 15. In use, a load rests atop top boards 12, so enough top boards 12 should be provided to adequately balance and support the load. Bottom boards 15 serve to strengthen pallet 10. As shown in FIG. 1A, some bottom boards 15 are partially laterally offset from top boards 12 to provide adequate support to runner assemblies 14 while minimizing the weight of pallet 10.

Top boards 12, runner assemblies 14, and bottom boards 15 are formed from a plastic material, including, but not limited to, high density polyethylene, polypropylene, nylon, polyvinyl chloride (PVC), or another extrudeable plastic material, as well as mixtures of those plastic materials with other substances such as wood powder, calcium carbonate, and talc. These components of pallet 10 may be formed by any plastic formation method well-known in the art, including, but not limited to, extrusion, injection molding, thermoforming, rotational molding, and vacuum molding. The exemplary method is extrusion, due to the low start-up costs, the low tooling costs, the ability to use recycled materials for manufacturing, the flexibility, and the high production rate. The extrusion method will be discussed in more detail below.

As shown in FIG. 1A, top boards 12 have top surface 16 and bottom surface 18 that extends essentially parallel to top surface 16. Top surface 16 of top boards 12 acts as the load bearing surface, while bottom surface 18 of top boards 12 contacts runner assemblies 14. A textured finish may be added to top surface 16 of top boards 12. A textured surface may enhance the welding process by increasing the available surface area for the weld. In addition, a textured surface may provide a less slippery surface in contact with the load. Like top boards 12, bottom boards 15 have top surface 42 and bottom surface 44. Top surface 42 of bottom boards 15 contacts runner assemblies 14.

Figure 3:
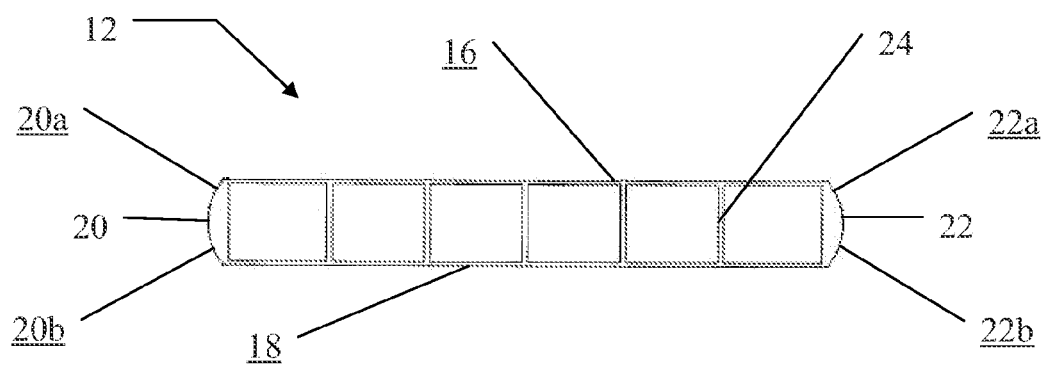
FIG. 3 is an elevational view of a board in accordance with the present invention.

As shown in FIG. 3, each top board 12 has a generally elongated planar configuration that includes two side walls, 20 and 22, which connect top surface 16 to bottom surface 18. Side walls 20 and 22 may be generally straight or rounded. For example, in the illustrated embodiment of FIG. 3, the outer surface of each side wall 20, 22, is rounded. In this illustrated embodiment, the outer surface of each side wall 20, 22, extends inwardly in an upward direction from a location about midway between top wall 16 and bottom wall 18 toward top wall 16 to define a corresponding top chamfer surface 20a, 22a, and extends inwardly in a downward direction from a location about midway between top wall 16 and bottom wall 18 toward bottom wall 18 to define a corresponding bottom chamfer surface 20b, 22b. In order to reduce the weight of top boards 12 and the amount of plastic required in manufacturing, top boards 12 may be generally hollow. The strength of top boards 12 may be enhanced by the addition of any number of board supports 24, which connect top surface 16 to bottom surface 18 in the area between side walls 20 and 22. Generally, these board supports 24 add strength to top boards 12 without adding significant weight to top boards 12.

An exemplary top board 12 is approximately 5½" wide and approximately ¾" tall. Top surface 16 and bottom surface 18 are less than approximately ¹⁄₃₀" thick, while rounded side walls 20 and 22 are approximately ⅛" thick at their widest points. In the same embodiment, each top board 12 also includes five board supports 24 spaced less than approximately 1" apart, each board support 24 having a thickness of approximately 1/20". The weight of a 48" long top board 12 having these dimensions is approximately 1.02 pounds.

According to an exemplary embodiment of the present invention, bottom boards 15 may have a generally similar configuration and construction as top boards 12, as shown in FIG. 1A. Thus, like top boards 12, each bottom board 15 may have a generally elongated planar configuration that includes two side walls, including side wall 20' shown in FIG. 2, which connect top surface 42 to bottom surface 44 of bottom board 15. The side walls may be generally straight or rounded. Also, like top boards 12, each bottom board 15 may include any number of board supports 24' connecting top surface 42 to bottom surface 44 of bottom board 15.

Figure 2:
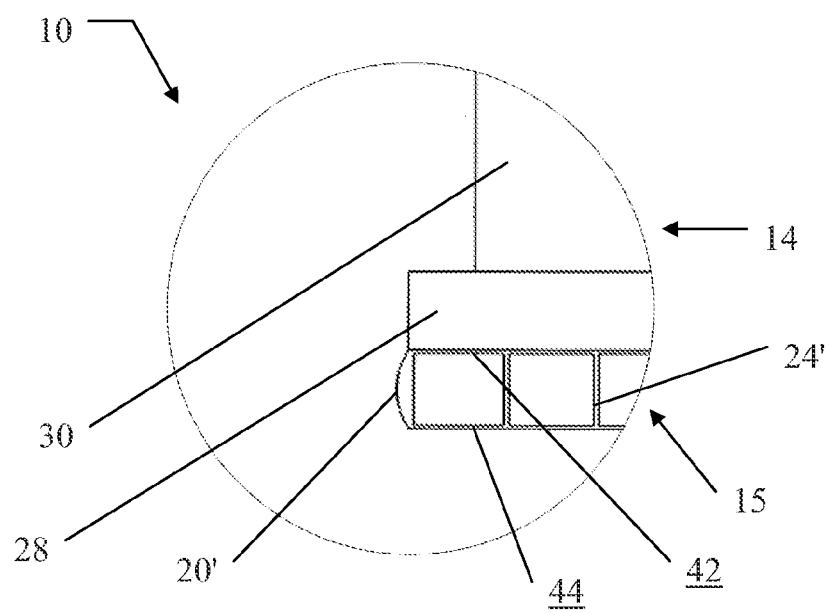
FIG. 2 is a partial elevational view of the pallet of FIG. 1A showing the encircled portion of FIG. 1A that is labeled as FIG. 2.

According to another exemplary embodiment of the present invention, illustrated in FIG. 2, top boards 12 and/or bottom boards 15 may project beyond runner assemblies 14. Specifically, the curved side walls, such as side wall 20' of FIG. 2, may project beyond runner assemblies 14. For example, top boards 12 and/or bottom boards 15 may project approximately 1/8" beyond runner assemblies 14. This exemplary arrangement provides pallet 10 having smooth edges to limit the risk of damage to the load carried on pallet 10 and workers handling pallet 10.

As noted above, extrusion is the exemplary method of manufacturing the top boards 12 and bottom boards 15. Top boards 12 will be used to describe this method. Molten plastic is fed through a channel (not shown) that forms the exterior shape of top board 12. Within the channel, voids in an extrusion plate (not shown) take the shape of top board 12. The embodiment described in the previous paragraph, in which each top board 12 contains five evenly-spaced board supports 24, will be used to further describe this point. Molten plastic is fed through a channel that is generally rectangular in cross-sectional shape to form the exterior shape of top board 12. Within this channel, the molten plastic is forced through an extrusion plate having six solid rectangular portions, thereby forming six generally rectangular hollow sections within the interior of top board 12. As the plastic solidifies, it takes the shape of top board 12 with five board supports 24. Top board 12 is then cut to its desired length. More generally, the number, size, and spacing of the voids in the extrusion plate determine the number, size, and spacing of board supports 24, and the shape of the channel determines the exterior shape of top board 12.

As shown in FIGS. 4-10, each runner assembly 14 includes at least two runner boards, upper runner board 26 and lower runner board 28. In addition, each runner assembly 14 includes any number of runner supports 30 that extend between upper runner board 26 and lower runner board 28. As mentioned above, bottom surface 18 of top boards 12 contacts runner assemblies 14, and top surface 42 of bottom boards 15 contacts runner assemblies 14. More specifically, bottom surface 18 of top boards 12 contacts upper runner boards 26 of runner assemblies 14, and top surface 42 of bottom boards 15 contacts lower runner boards 28 of runner assemblies 14.

According to an exemplary embodiment of the present invention, both upper runner boards 26 and lower runner boards 28 may have a generally similar configuration and construction as top boards 12 and bottom boards 15, which increases the efficiency of the manufacturing process. For example, like top boards 12 and bottom boards 15, upper runner boards 26 and lower runner boards 28 may have may have a generally elongated planar configuration. As another example, upper runner boards 26, lower runner boards 28, top boards 12, and bottom boards 15, may have substantially the same cross-sectional construction, and each may be cut to a desired length. In this exemplary embodiment, upper runner boards 26, lower runner boards 28, top boards 12, and bottom boards 15, may all be manufactured using the plastic extrusion manufacturing process described above, with only a single channel/extrusion plate arrangement required to manufacture all of the boards, and then a single board may be cut into pieces to provide upper runner boards 26, lower runner boards 28, top boards 12, and bottom boards 15. The exemplary method is not intended to limit the scope of the present invention. For example, it is also within the scope of the present invention to use materially different extrusion plates to manufacture upper runner boards 26, lower runner boards 28, top boards 12, and bottom boards 15.

Runner supports 30 may be constructed in any shape, such as rounded, oblong blocks 32 (FIGS. 7-10) or tubes 34 (FIGS. 1-2 and FIGS. 4-6). Runner supports 30 may be hollow, or contain cross-supports 36. Runner supports 30 may be manufactured by applying the extrusion methodology detailed above, wherein a channel forms the exterior shape of runner supports 30 and voids in an extrusion plate form the interior shape of runner supports 30. As noted above, runner supports 30 may also be manufactured by injection molding.

Figure 4:
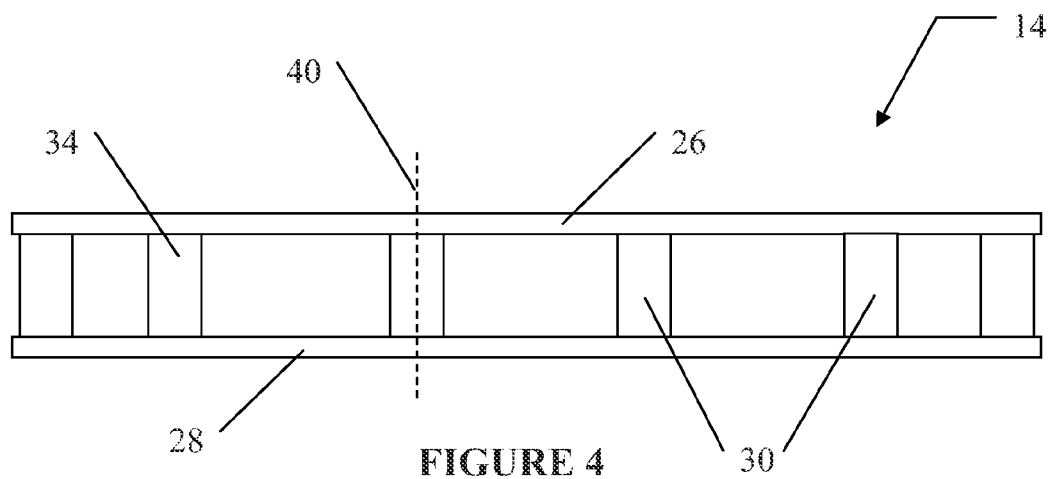
FIG. 4 is an elevational view of an embodiment of a runner assembly in accordance with the present invention.
Figure 5:
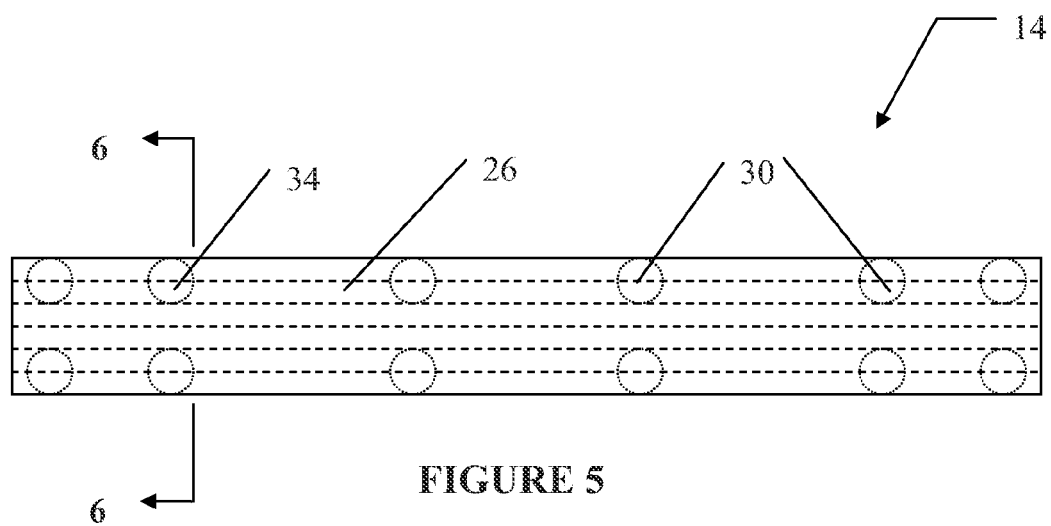
FIG. 5 is a plan view of the runner assembly of FIG. 4.
Figure 6:
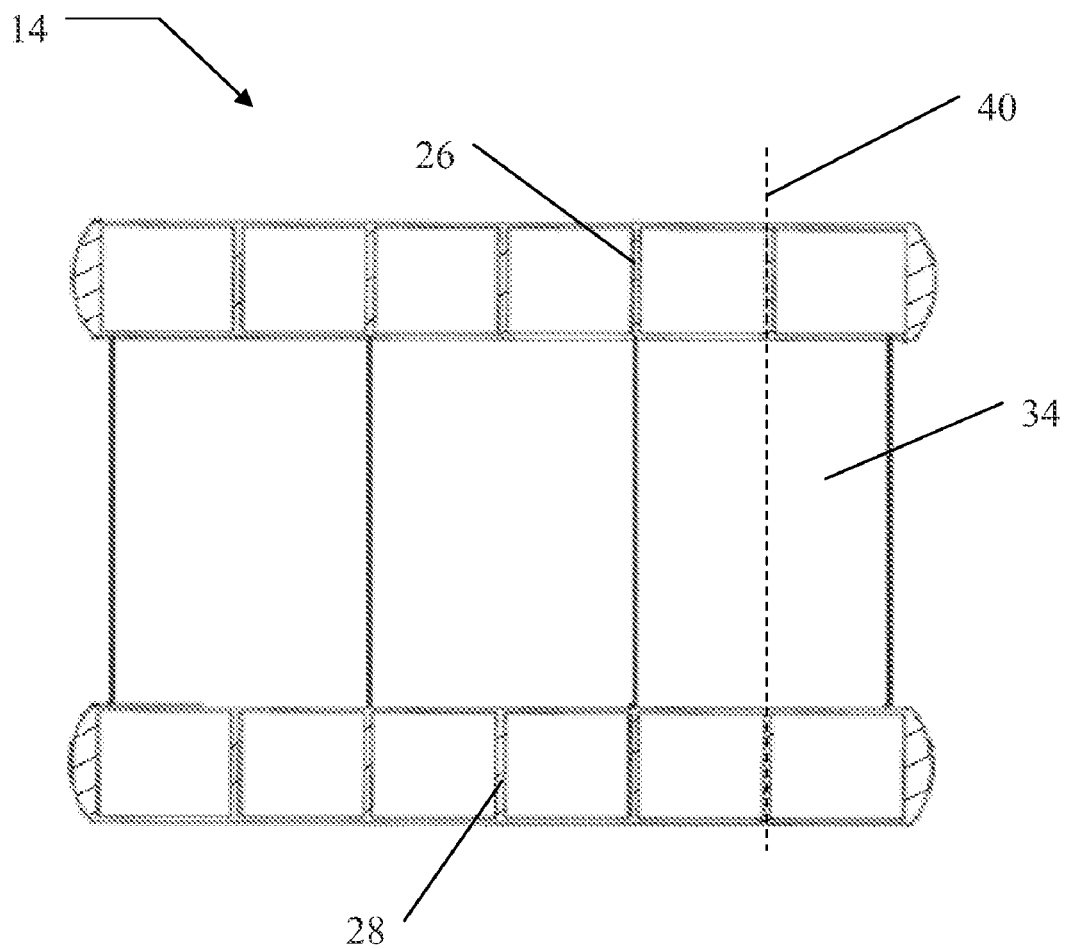
FIG. 6 is a cross-sectional view of the runner assembly of FIG. 5, taken along line 6-6 of FIG. 5.
Figure 7:
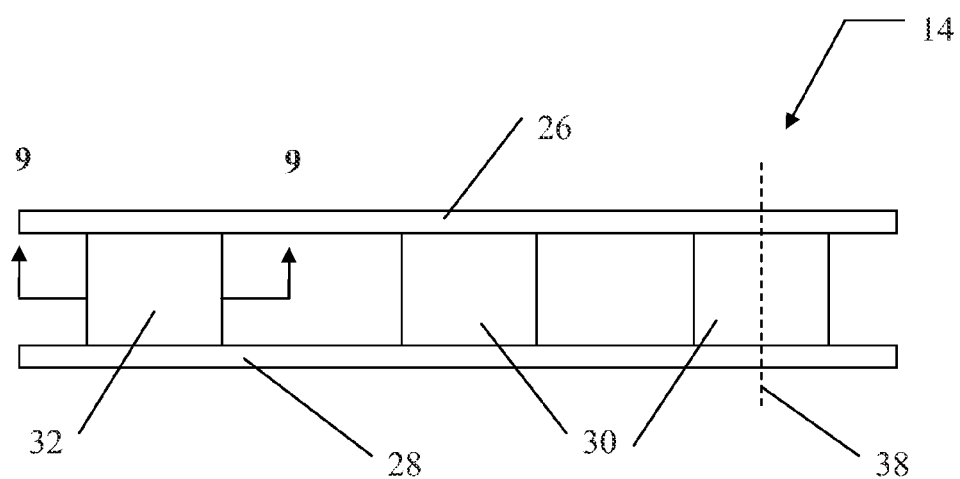
FIG. 7 is an elevational view of another embodiment of a runner assembly in accordance with the present invention.
Figure 8:
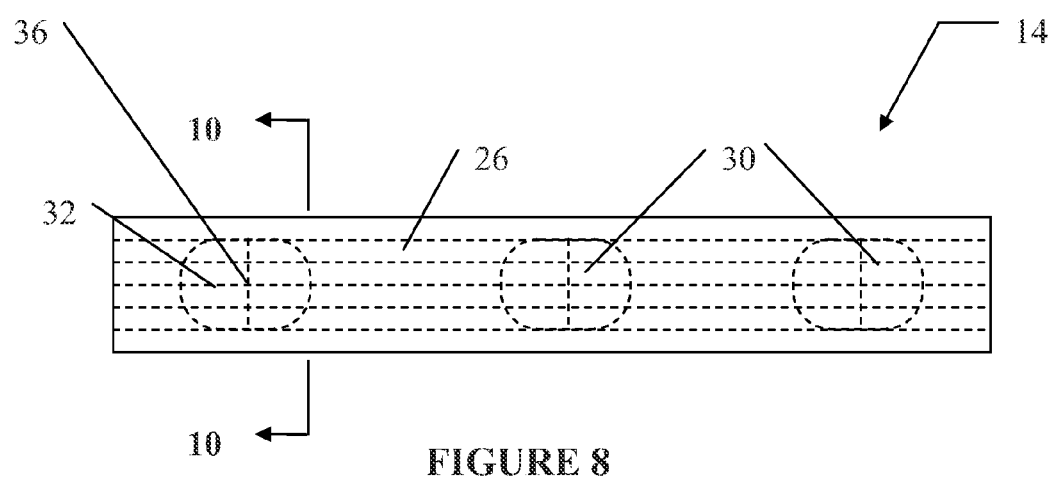
FIG. 8 is a plan view of the runner assembly of FIG. 7.
Figure 9:
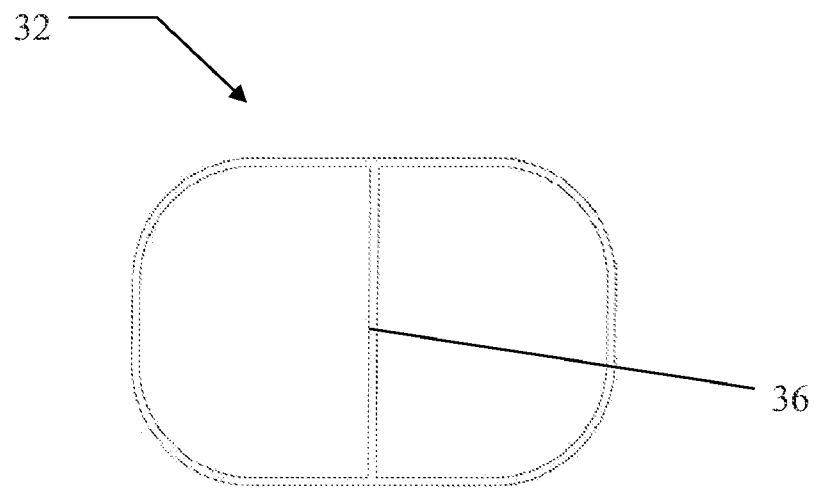
FIG. 9 is a cross-sectional view of the runner assembly of FIG. 7, taken along line 9-9 of FIG. 7.
Figure 10:
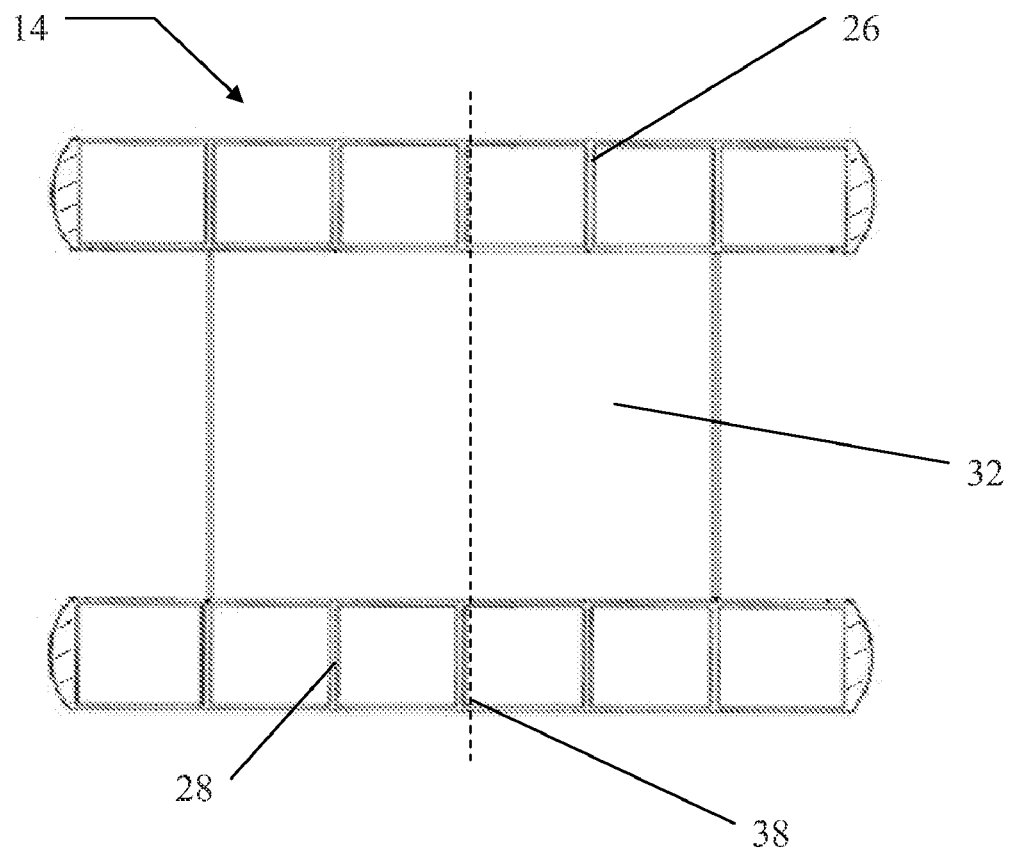
FIG. 10 is a cross-sectional view of the runner assembly of FIG. 8, taken along line 10-10 of FIG. 8.

According to an exemplary embodiment of the present invention, illustrated in FIGS. 4-6, each runner assembly 14 includes pairs of hollow tubes 34 placed side-by-side and in parallel with their longitudinal axes 40 extending substantially transversely to runner boards 26 and 28. Each exemplary tube 34 has an outer diameter of approximately 2¼", a wall thickness of approximately 1/8", and a height of approximately 3¾". This exemplary arrangement provides a pallet 10 having a suitable weight and strength. As shown in FIG. 1A, some tubes 34 may be aligned with one or both of top board 12 and bottom board 15, while other tubes 34 may be laterally offset from both top board 12 and bottom board 15.

As with top boards 12 and bottom boards 15, the goal in manufacturing runner assemblies 14 is to reduce the weight of runner assemblies 14 and the amount of plastic required to manufacture runner assemblies 14, all while maintaining the strength of runner assemblies 14. The size and thickness of the components of runner assembly 14, the number and spacing of runner supports 30, and the number of cross-supports 36 within runner supports 30, may all be adjusted to best achieve this goal, as discussed in more detail below.

The various elements of pallet 10 may be connected by any method well-known in the art, including, but not limited to, ultrasonic welding, hot plate welding, vibration welding, and extrusion seam welding. The same method may be used to attach runner assemblies 14 to top boards 12 and bottom boards 15, and to attach runner boards 26 and 28 to runner supports 30, although separate types of connections may be made at each attachment point. Hot plate welding presents several advantages over other connection methods in this exemplary embodiment. First, hot plate welding involves full part-to-part welding, thereby resulting in a stronger weld. Second, hot plate welding is more forgiving, thereby permitting greater variances in the materials and the elements' shapes and sizes. Third, hot plate welding is a single-step process. Finally, as opposed to ultrasonic welding, hot plate welding does not require weld flaps and results in round edges at the joints. The round edges produced from hot plate welding may create stronger joints and may better accommodate pallet jacks. However, with different design constraints, other methods of connecting such as ultrasonic welding may have advantages in such designs.

In operation, pallet 10 may be used to support articles while being lifted by a mobile forklift, pallet jack, or another jacking device. The articles may be placed on top surface 16 of pallet 10, and may be secured to pallet 10 by straps, plastic film, or other suitable fastening devices.

Pallet 10 may be designed for either two-way or four-way entry by a jacking device. In a two-way design, the jacking device may enter gaps between adjacent runner assemblies 14 in a direction generally parallel to runner assemblies 14. In a four-way design, the jacking device may enter in the same manner as a two-way design, and may also enter transverse to runner assemblies 14 in gaps between upper runner boards 26, lower runner boards 28, and adjacent runner supports 30.

When pallet 10 becomes damaged or otherwise reaches the end of its useful life, it may be recycled. In addition, the damaged pallet 10 may be ground into flakes and reused by mixing the flakes with new material to manufacture new pallets.

According to an exemplary embodiment of the present invention, the size and strength of pallet 10 may be customized to accommodate various loads. The ability to customize pallet 10 allows a consumer to order pallet 10 to suit his or her own specialized needs.

Some modifications to pallet 10 may be made without having to modify the manufacturing process whatsoever. For example, pallet 10 may be customized by adjusting the number of top boards 12, bottom boards 15, or runner assemblies 14 per pallet 10, or by adjusting the length of any component. For example, a 48"×40" pallet 10 could be manufactured using 48" long top boards 12 and bottom boards 15, and 40" long runner assemblies 14, or vice versa. As another example, to accommodate heavy loads, more top boards 12, bottom boards 15, and/or runner assemblies 14 may be used per pallet 10 than to accommodate lighter loads.

Other modifications to pallet 10 may be made with only minor adjustments to the manufacturing process. For example, pallet 10 may be customized by adjusting the dimensions of a component, such as the thickness or height of the component, by adjusting the number of or spacing between adjacent supports, such as board supports 24, runner supports 30, or cross-supports 36, and/or by adjusting the raw materials.

One possible method for analyzing the strength of pallet 10, and in turn modifying pallet 10 to accommodate various load requirements and various load distributions, is finite element analysis (FEA). FEA may be used to measure the deflections, strains, and stresses on pallet 10, or any component thereof, when a load is applied. In turn, results of FEA may be used to customize pallet 10 to best utilize raw materials, and therefore lower costs, while accommodating the specific load requirement and load distribution. The following examples illustrate use of the FEA method to customize pallet 10.

EXAMPLE 1

Board Height

In one example, FEA was used to analyze critical dimensions of top boards 12. Top boards 12 of various heights were supported atop two simulated sawhorses, located 2" in from each end. An 1800-pound load was applied to each of the top boards 12. FEA revealed that, by increasing the height of top board 12 from ⅝" to ¾", the resistance to deflection increased by 25%. Increasing the height of top board 12 is accomplished by increasing the length of side walls 20 and 22, for example.

EXAMPLE 2

Type of Runner Supports

In another example, FEA was used to analyze different types of runner supports 30. Various runner assemblies 14 were subjected to the same load as in the previous example. One embodiment of runner assembly 14 included three rounded, oblong blocks 32, each containing a single cross-support 36, placed with their longitudinal axes 38 extending substantially transversely to runner boards 26 and 28. Each block 32 was approximately 8" long and 5⅓" wide with rounded edges, and approximately 6" tall. Each cross-support 36 extended the width of block 32 and was approximately 1/10" thick. The total weight of three blocks 32 was approximately 0.88 pounds. A second embodiment of runner assembly 14 included six pairs of hollow tubes 34 placed side-by-side and in parallel with their longitudinal axes 40 extending substantially transversely to runner boards 26 and 28. Each tube 34 had an outer diameter of 2⅛", a wall thickness of ⅛", and a height of 3¾". The total weight of twelve tubes 34 was 0.98 pounds, merely 0.1 pound more than the first embodiment using oblong blocks 32. Even though the weight of the runner assembly 14 remained essentially the same, FEA revealed that the resistance to deflection of the second embodiment using tubes 34 increased by 50% over the first embodiment using oblong blocks 32.

EXAMPLE 3

Arrangement of Runner Supports

In yet another example, FEA was used to analyze the number of and spacing between runner supports 30. Generally, the spacing of runner supports 30 is determined by two factors. First, runner supports 30 should be spaced to allow for the insertion of the jacking device, as described above. Second, runner supports 30 should be spaced to resist the area of greatest deflection. This second factor was evaluated using FEA. Various runner assemblies 14 were subjected to the same load as in the previous examples. A first embodiment of runner assembly 14 included six pairs of hollow tubes 34, and a second embodiment of runner assembly 14 included seven pairs of hollow tubes 34. FEA revealed that the resistance to deflection of the second embodiment, in one arrangement, increased by approximately 0.1" over the first embodiment.

While this invention has been described as having exemplary designs, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A pallet system comprising:
a plurality of top boards having an elongated planar configuration, the plurality of top boards formed of plastic; and
a plurality of runner assemblies formed of plastic and positioned in spaced relation beneath the plurality of top boards, each of the plurality of runner assemblies extending between a first terminal end and a second terminal end along a runner axis, the runner axis oriented generally transversely to the plurality of top boards, each of the plurality of runner assemblies comprising:
a top runner board;
a bottom runner board;
a first runner support extending between the top and bottom runner boards; and
a second runner support spaced apart from the first runner support and extending between the top and bottom runner boards, the first and second runner supports being spaced the same distance from the first terminal end of the runner assembly.

2. The pallet system of claim 1, wherein the top and bottom runner boards have a generally similar configuration as the plurality of top boards.

3. The pallet system of claim 1, further comprising a plurality of bottom boards positioned beneath the plurality of runner assemblies, the runner axis oriented generally transversely to the plurality of bottom boards.

4. The pallet system of claim 1, wherein the first and second runner supports are located between adjacent top boards.

5. The pallet system of claim 1, wherein the first and second runner supports are arranged in parallel to each other and in a direction perpendicular to the runner axis.

6. The pallet system of claim 1, wherein the first and second runner supports are located side-by-side between the top and bottom runner boards.

7. The pallet system of claim 1, wherein the top runner board has opposing side walls that extend parallel to the runner axis, the first and second runner supports being located between the opposing side walls of the top runner board.

8. The pallet system of claim 1, wherein the bottom runner board has opposing side walls that extend parallel to the runner axis, the first and second runner supports being located between the opposing side walls of the bottom runner board.

9. The pallet system of claim 1, wherein the first and second runner supports comprise hollow tubes.

10. The pallet system of claim 1, further comprising:
a third runner support extending between the top and bottom runner boards; and
a fourth runner support spaced apart from the third runner support and extending between the top and bottom runner boards, the third and fourth runner supports spaced the same distance from the first terminal end of the runner assembly.

11. The pallet system of claim 10, wherein the first and second runner supports are located closer to the first terminal end of the runner assembly than the third and fourth runner supports.

12. The pallet system of claim 11, wherein the first and second runner supports are located side-by-side between the top and bottom runner boards and the third and fourth runner supports are located side-by-side between the top and bottom runner boards.

13. A pallet system comprising:
a plurality of top boards having an elongated planar configuration, the plurality of top boards formed of plastic; and
a plurality of runner assemblies formed of plastic and positioned in spaced relation beneath the plurality of top boards, each of the plurality of runner assemblies extending between a first terminal end and a second terminal end along a longitudinal runner axis, the longitudinal runner axis oriented generally transversely to the plurality of top boards, each of the plurality of runner assemblies comprising:
a top runner board;
a bottom runner board;
a first runner support extending between the top and bottom runner boards; and
a second runner support spaced apart from the first runner support and extending between the top and bottom runner boards, the first and second runner supports being arranged in parallel to each other and in a direction perpendicular to the longitudinal runner axis.

14. The pallet system of claim 13, wherein the top runner board has opposing side walls that extend parallel to the longitudinal runner axis, the first and second runner supports being located between the opposing side walls of the top runner board.

15. The pallet system of claim 13, wherein the bottom runner board has opposing side walls that extend parallel to the longitudinal runner axis, the first and second runner supports being located between the opposing side walls of the bottom runner board.

16. A pallet system comprising:
a plurality of top boards having an elongated planar configuration, the plurality of top boards formed of plastic, each top board including a top wall, a bottom wall that extends substantially parallel to the top wall, and first and second side walls joining the top and bottom walls, the top wall, the bottom wall, and the first and second side walls of each top board cooperating to define a substantially hollow interior, the first side wall of at least an outer-most one of the plurality of top boards having an inner surface that faces the hollow interior and an outer surface opposite the inner surface, the inner surface extending from the top wall to the bottom wall in a direction perpendicular to the top and bottom walls, whereby the top and bottom walls are horizontally aligned at opposing ends of the first side wall, at least a portion of the outer surface deviating from the direction perpendicular to the top and bottom walls at a location between the top and bottom walls; and
a plurality of runner assemblies formed of plastic, the plurality of runner assemblies positioned beneath the plurality of top boards and extending generally transversely to the plurality of top boards, each of the plurality of runner assemblies comprising:
a top runner board;
a bottom runner board; and
a plurality of runner supports extending between the top and bottom runner boards.

17. The pallet system of claim 16, further comprising a plurality of bottom boards positioned beneath the plurality of runner assemblies, the plurality of bottom boards extending generally transversely to the plurality of runner assemblies and generally parallel to the plurality of top boards.

18. The pallet system of claim 16, wherein the portion of the outer surface that deviates from the direction perpendicular to the top and bottom walls extends from at least one of the top and bottom walls to a location approximately midway between the top and bottom walls.

19. The pallet system of claim 16, wherein the plurality of runner supports of each runner assembly are arranged in pairs, the paired runner supports being spaced an equal distance from a terminal end of the runner assembly.

20. The pallet system of claim 16, wherein the plurality of runner supports of each runner assembly are arranged in parallel rows, the rows being spaced apart to accommodate passage of a forklift.

* * * * *